United States Patent
Medici, Jr. et al.

[19]

[11] Patent Number: 6,056,430
[45] Date of Patent: May 2, 2000

[54] PLASTICATING APPARATUS HAVING A MULTICHANNEL WAVE SCREW WITH A CROSS CHANNEL SOLIDS TRANSITION

[75] Inventors: John C. Medici, Jr., Fredericktown; Stephen T. Takashima; Gary A. Beilstein, both of Mansfield, all of Ohio

[73] Assignee: HPM Corporation, Mount Gilead, Ohio

[21] Appl. No.: 09/161,205

[22] Filed: Sep. 25, 1998

[51] Int. Cl.[7] .................................................. B29B 7/14
[52] U.S. Cl. .................................................. 366/88; 366/89
[58] Field of Search ................................. 366/79, 88, 89, 366/323, 90

[56] References Cited

U.S. PATENT DOCUMENTS

| | | | |
|---|---|---|---|
| 2,753,595 | 7/1956 | Dulmage | 18/12 |
| 3,271,819 | 9/1966 | Lacher | 18/12 |
| 3,367,635 | 2/1968 | Gresch | 259/4 |
| 3,599,292 | 8/1971 | Ronzoni | 18/30 |
| 3,671,021 | 6/1972 | Pomper et al. | 259/109 |
| 3,701,512 | 10/1972 | Schippers et al. | 259/191 |
| 3,737,151 | 6/1973 | Schaeffer et al. | 259/191 |
| 3,858,856 | 1/1975 | Hsu | 259/191 |
| 3,867,079 | 2/1975 | Kim | 425/208 |
| 3,870,284 | 3/1975 | Kruder | 259/191 |
| 4,000,884 | 1/1977 | Chung | 259/191 |
| 4,060,226 | 11/1977 | Schweller | 366/75 |
| 4,074,362 | 2/1978 | Kruder et al. | 366/82 |
| 4,107,788 | 8/1978 | Anders | 366/81 |
| 4,112,519 | 9/1978 | Kruder | 366/266 |
| 4,128,341 | 12/1978 | Hsu | 366/89 |
| 4,143,974 | 3/1979 | Strassheimer et al. | 366/78 |
| 4,154,536 | 5/1979 | Sokolow | 366/90 |
| 4,173,417 | 11/1979 | Kruder | 366/89 |
| 4,185,060 | 1/1980 | Landley, Jr. | 264/54 |
| 4,201,481 | 5/1980 | Iddon et al. | 366/79 |
| 4,215,978 | 8/1980 | Takayama et al. | 425/190 |
| 4,227,870 | 10/1980 | Kim | 425/208 |
| 4,277,182 | 7/1981 | Kruder | 366/89 |
| 4,314,765 | 2/1982 | Hotz | 366/75 |
| 4,330,214 | 5/1982 | Willert | 366/78 |
| 4,341,474 | 7/1982 | Wheeler, Jr. et al. | 366/88 |
| 4,573,799 | 3/1986 | Anders | 366/89 |
| 4,729,662 | 3/1988 | O'Brien | 366/89 |
| 4,733,970 | 3/1988 | Yokama | 366/79 |
| 4,840,492 | 6/1989 | Nakamura | 366/81 |
| 4,896,969 | 1/1990 | Dray | 366/88 |
| 4,925,313 | 5/1990 | Nunn | 366/81 |
| 4,944,906 | 7/1990 | Colby et al. | 264/101 |
| 4,946,356 | 8/1990 | Kumazaki | 425/135 |
| 5,033,860 | 7/1991 | Nakamura | 366/89 |
| 5,035,509 | 7/1991 | Kruder | 366/89 |
| 5,071,256 | 12/1991 | Smith et al. | 366/89 |
| 5,088,914 | 2/1992 | Brambilla | 425/208 |
| 5,288,223 | 2/1994 | Toro | 425/208 |
| 5,375,992 | 12/1994 | Kruder et al. | 366/89 |
| 5,486,328 | 1/1996 | Luker | 264/211.23 |
| 5,534,204 | 7/1996 | Aoki et al. | 264/102 |
| 5,551,777 | 9/1996 | Tjahjadi et al. | 366/100 |
| 5,597,525 | 1/1997 | Koda et al. | 264/537 |
| 5,599,097 | 2/1997 | Christie | 366/88 |
| 5,599,098 | 2/1997 | Christie | 366/90 |
| 5,630,968 | 5/1997 | Wang et al. | 264/53 |

FOREIGN PATENT DOCUMENTS

| | | |
|---|---|---|
| 61-222706 | 10/1986 | Japan . |
| 62-42820 | 2/1987 | Japan . |
| 63-104811 | 5/1988 | Japan . |

*Primary Examiner*—Tony G. Soohoo
*Attorney, Agent, or Firm*—Baker & Daniels

[57] ABSTRACT

A multichannel wave plasticating screw having a feed section, barrier melting section, and metering section wherein solid material is transitioned from the trailing side of the primary flight to the push side of the primary flight at the terminal end of the barrier melting section. The solids transition is accomplished by interchanging, or "reversing" the diameter and width of the primary and secondary flights at the terminal end of the transition section. Alternatively, the barrier flight includes a short section of increased pitch at the terminal end of the barrier melt section which abruptly narrows the solids channel and thereby forces solid material over the barrier flight into the melt channel and on the pushing side of the primary flight. Transferring solid material from the trailing side to the push side of the primary flight increases the shear and pressure applied thereto and more quickly and efficiently melts solids.

25 Claims, 3 Drawing Sheets

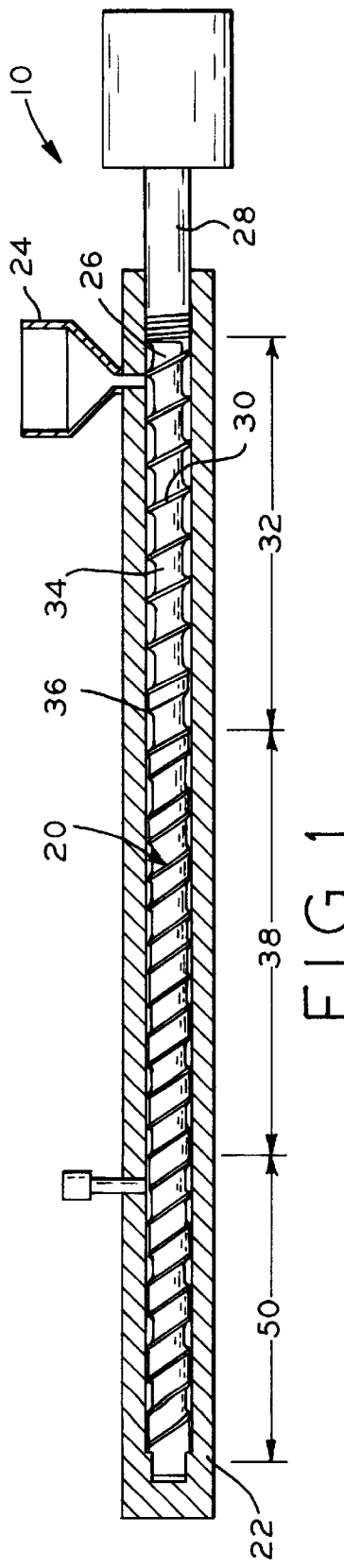
FIG._1
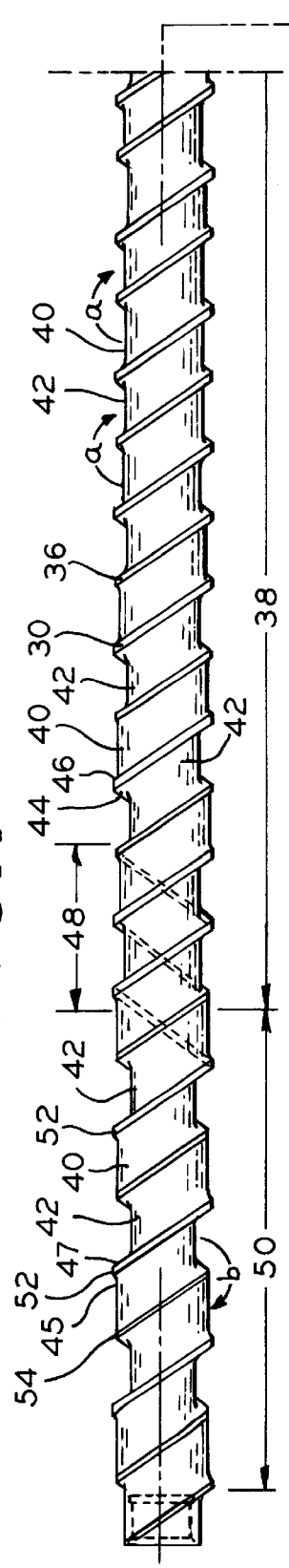
FIG._2
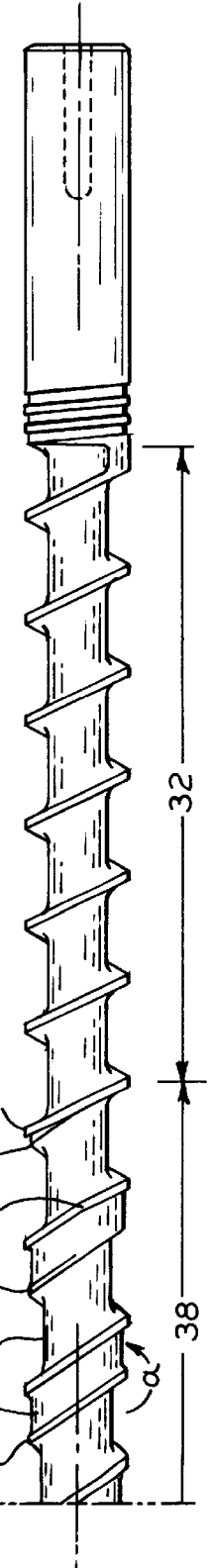

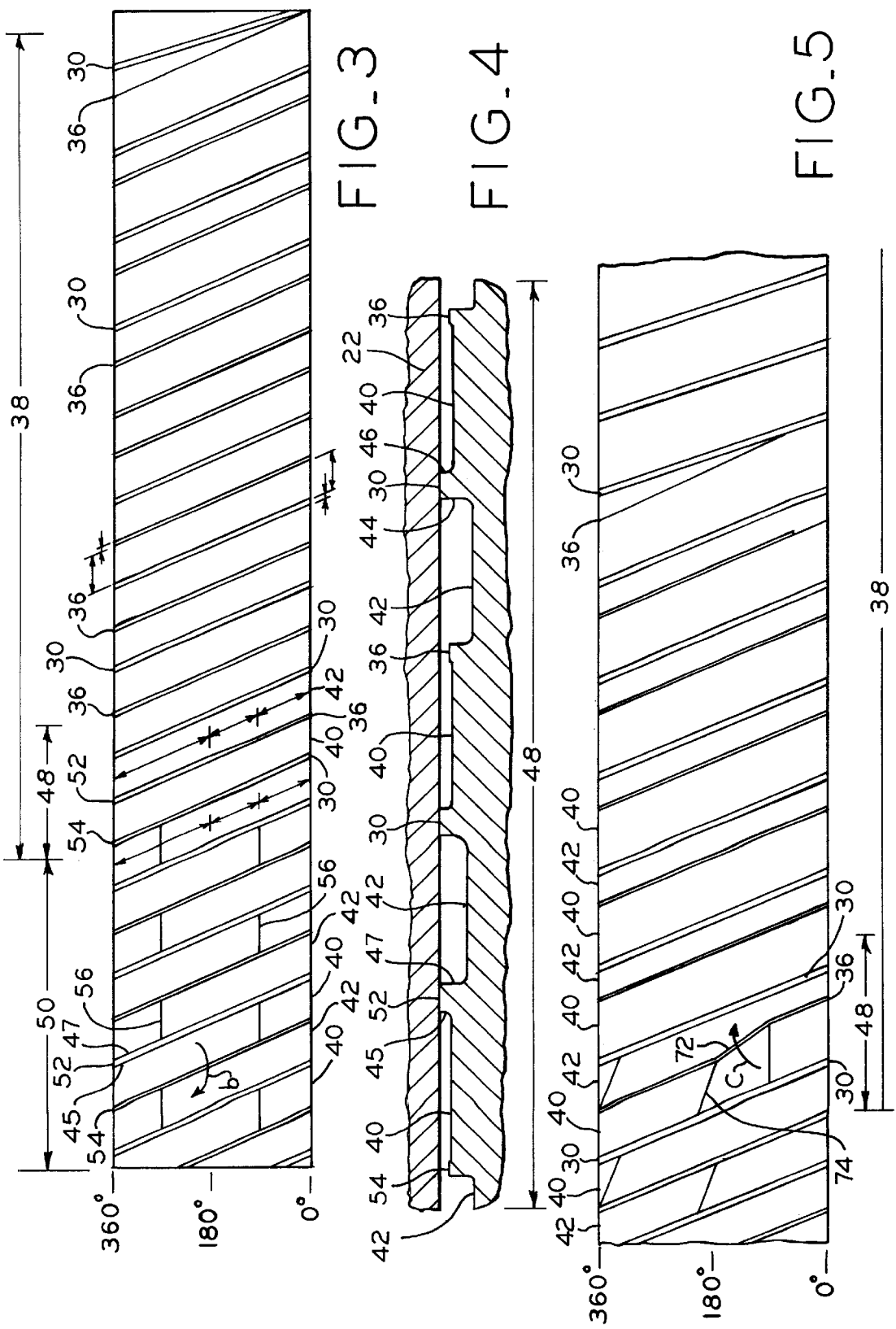

PLASTICATING APPARATUS HAVING A MULTICHANNEL WAVE SCREW WITH A CROSS CHANNEL SOLIDS TRANSITION

BACKGROUND OF THE INVENTION

This invention relates to plasticating extruders of the type in which a screw, rotatable within a barrel, is employed to extrude material to a die or injection mold connected to the outlet end of the barrel. The invention is concerned particularly with improvements in high output plasticating extruders.

A plasticating extruder receives polymer pellets or powder (often together with formulation additives in liquid or particle form), works and raises the temperature of the polymer sufficiently to dispose it in a melted or plastic state, and delivers the melted polymer under pressure through a restricted outlet or die. Ordinarily, it is desirable that the discharge extrudate be fully melted, well mixed, uniform in temperature and pressure, and substantially free of small jells and other fine structure agglomerations. It is also desirable that the rate of delivery of the molten polymer through the die be regulated simply by changing the rate of extruder screw rotation and that the rate of delivery of the selected screw speed be substantially uniform.

The basic plasticating apparatus includes an elongated barrel which may be heated or cooled at various locations along its length and a screw which extends longitudinally through the barrel. The screw has a helical conveying flight on its surface which cooperates with the cylindrical internal surface of the barrel to define an elongated helical channel.

A typical modern plasticating screw includes a plurality of sections configured specifically to the attainment of particular functions. One common design includes a feed section, transition section, and a multi-channel wave metering section. The feed section extends beneath and forwardly from a feed opening where polymer in pellet or powder form is introduced into the extruder to be carried forward along the inside of the barrel by the feed section of the screw. As the polymer material is advanced along the channel, it is worked by the helical threads and barrel. This, in turn, generates heat, and melting of the polymer proceeds as the material is moved along the feed section.

Downstream from the feed section is a conventional single channel transition section of decreasing channel depth in which melting of the material continues as it moves therethrough. Actually, the melting takes place for the most part near the barrel surface at an interface between a film of molten polymer and a solid bed of packed particle polymer. The thin layer of melt film sticks to the barrel wall, but is scraped off by the rotating screw flight and therefore collects in front of the flight. Thus, a somewhat stratified channel composition develops in which a solids bed is positioned at the trailing side of the flight whereas the melt is positioned at the front side, or "push" side of the flight.

The partially stratified composition existing at the end of the transition is emptied into the multi-channel wave metering section, whose function is to exert a pumping action on the molten polymer. Typically, two helical flow channels extend through the metering section and are separated by a barrier flight. Each flow channel includes repeating wave cycles of varying depth, having alternating wave crests and valleys. The wave cycles of the adjacent channels are typically helically offset so that a wave crest of one channel lies opposite a valley in the adjacent channel and vice versa. The barrier flight is undercut in a manner which facilitates the flow of melt thereacross from one channel to the other, while restricting the flow thereacross of unwanted solids. Solids therefore tend to pass instead through a restriction formed by the wave crest while the melt travels across the barrier flight into the adjacent channel, thereby minimizing the formation of pressure pulses in the extrudate flow. Such a double wave design is well known and is disclosed in U.S. Pat. No. 4,173,417 which is assigned to the assignee of the present invention, and is incorporated herein by reference.

Improvements in the above-described design as disclosed in U.S. Pat. No. 4,173,417 have been directed to the multi-channel wave metering section, while leaving the conventional transition section unchanged. For example, U.S. Pat. No. 4,925,313 which is assigned to the assignee of the present invention, discloses a double wave metering section having two barrier flights which include segments that are of normal height and are in relatively close clearance with the inner wall of the barrel. The two barrier flights also include undercut segments which form larger gaps between the barrel wall than do the normal segments. Thus the normal height barrier flight segments are separated by undercut segments which extend from one peak to the next peak of the adjacent channel. U.S. Pat. No. 5,035,509, assigned to the assignee of the present invention, discloses a double wave metering section wherein the barrier flight forms a zig-zag shape which divides the helical passage into channels of varying cyclic depth in the helical direction of the channels. Further developments include a triple channel wave screw as disclosed in U.S. Pat. No. 5,219,590, also assigned to the assignee of the present invention. As noted, all of these improvements are directed to the multi-channel wave metering section of the screw while leaving the design of the conventional transition section unchanged.

A second common plasticating screw design, referred to as a "barrier screw," utilizes the well established mechanism by which most of the melting occurs near the barrel surface. Such a screw includes a feed section, a barrier melting section and a metering section, the barrier melting section and metering section performing somewhat different functions than the transition section and the multichannel wave metering section described above.

The barrier melting section begins at the terminal end of the feed section, whereby a barrier flight is introduced intermediate the helical thread of the primary flight, typically branching from the primary flight at an increased pitch. The increased pitch of the barrier flight typically continues for one or more turns until the barrier flight is located in a pre-determined position in the channel formed by the primary thread and the barrier thread. Thereupon, either the main flight or the barrier flight changes pitch so that the two flights are parallel throughout the remainder of the barrier melting section.

Thus, the barrier melting section is comprised of two adjacent helical channels, a solids channel and a melt channel, with the barrier flight disposed therebetween. As the screw rotates, the thin melt film which develops at the outer periphery of the solids channel is conveyed over the barrier flight and upstream into the adjacent melt channel. The barrier flight is "undercut," providing increased clearance with the barrel wall to facilitate the conveyance of melt thereover. In this manner, melted material is continuously conveyed from the thin melt film into the melt channel, thereby encouraging further solids to melt into the melt film.

From the above discussion, it can be appreciated that in a conventional barrier screw, solid material is located on the "trailing side" of the main flight whereas melt material is located at the "push" side of the main flight. Stated another way, the solids channel is located immediately downstream and adjacent to the barrier flight, and melt material formed in a thin film at the solid channel periphery is conveyed over the barrier flight upstream into the adjacent melt channel. The melt channel, then, is bordered on its downstream side by the barrier flight and is bordered on its upstream side by the main flight. It can thus be said that the melt material is located on the push side of the main flight because the main flight can be thought of as "pushing" the melt material in the melt channel.

It can now be understood that both of the above-described designs, i.e., the "multichannel wave metering screw" and the "barrier screw," involve supplying their transition sections supplying their respective metering sections with solids disposed on the trailing side of the main flight and melt disposed on the push side of the main flight. Such placement of solids material vis-a-vis the push side of the main flight is a natural outgrowth of extruder screw development.

SUMMARY OF THE INVENTION

The cross channel solids transition of the present invention moves solids to the push side of the main flight in the metering section of a plasticating screw and thereby produces higher pressure and shear which mixes and melts solids more effectively. Multi-channel wave metering screws and barrier melting screws are well known. However, the present invention modifies and combines the two technologies in a way which produces an improved plasticating screw having higher output capabilities than either of the two technologies alone.

Throughout the metering section of a plasticating screw, higher pressure and shear rates are obtained on the push side of the main flight because the main flight, as opposed to the barrier flight, provides reduced clearance with the inner barrel wall and is of an increased thread width, which in turn produces greater shear rate for the material being conveyed. Unfortunately, in the above described conventional plasticating screw, the solids are located primarily on the trailing side of the main flight instead of the push side of the main flight throughout the metering section. As a resulting disadvantage, the solids do not derive the benefits of the higher pressure and shear provided by the push side of the primary flight. The present invention overcomes this disadvantage by providing a screw including a multi-channel wave metering section and a barrier melting section, and then transferring solids to the push side of the main flight at the terminal end of the barrier melting section. Advantageously, placing the solids on the push side of the main flight results in higher pressure and shear being exerted upon the solids, thereby melting them more efficiently.

In one form, the present invention is a plasticating apparatus comprising a barrel having an inlet and an outlet. A rotatable screw is disposed within the barrel and cooperates with an inner wall of the barrel. The screw is adapted to plasticating resinous material fed into the barrel through the inlet. The screw comprises a feed section, a barrier melting section and a metering section which are disposed sequentially downstream of each other along the screw. The feed section includes a main flight having a pushing side facing downstream and a trailing side facing upstream. The main flight forms a feed channel at the inlet of the screw. A secondary flight is disposed in the barrier melting section intermediate the main flight. The secondary flight and the main flight divide the barrier melting section into a melt channel and a solids channel extending helically side-by-side. The secondary flight has helical threads with a diameter and width which are less than the diameter and width of the helical threads of the main flight. In this manner, melt material flows over the secondary flight and into the melt channel.

In the present invention, at the terminal end of the barrier melting section the main flight and secondary flights "interchange." That is to say, the main flight becomes a new barrier flight and the secondary flight becomes a new primary flight. In a preferred form, this interchange is accomplished by the secondary flight increasing in diameter and width within one 360° rotation about the longitudinal axis of the screw while the main flight decreases in diameter and width within one 360° rotation about the longitudinal axis of the screw. Thereafter, throughout the metering section, the new primary flight and the new barrier flight have a substantially constant diameter and width.

It can thus be understood that the novel "interchange" feature of the present invention results in the solids being placed on the push side of the new primary flight whereas the melt channel is then disposed along the trailing side of the new primary flight. Throughout the double wave metering section, melt material is nonetheless encouraged to flow back and forth across the new barrier flight by the placement of waves in both channels throughout the metering section. However, the unmelted solids gain the benefits of being pushed by the new main flight, which has reduced clearance and increased thread width. The solids are therefore melted more quickly than in conventional designs.

In another form, the present invention achieves placing solids on the push side of the main flight throughout the metering section by a different mechanism. This second form of the present invention involves a plasticating apparatus comprising a barrel having an inlet and an outlet. A rotatable screw is disposed within and cooperates with an inner wall of the barrel. The screw is adapted for plasticating resinous material fed into the barrel through the inlet. The screw comprises a feed section, a barrier melting section and a metering section located sequentially downstream along the screw. The feed section includes a main flight having a pushing side and a trailing side and the main flight forms a feed channel at the inlet of the screw. A secondary flight is disposed in the barrier melting section intermediate the main flight. The secondary flight and the main flight divide the barrier melting section into a melt channel and a wider solids channel extending helically side-by-side. The secondary flight has helical threads with a diameter and width less than the diameter and width of the helical threads of the main flight. In this manner, melt material flows over the secondary flight and into the melt channel.

This second form of the present invention includes an increased pitch section of the secondary flight located at a terminal end of the barrier melting section. Typically, the increased pitch section extends no more than 1½ turns about a longitudinal axis of the screw, whereupon the secondary flight resumes its original pitch after the increased pitch section. In this manner, the solids channel narrows during the increased pitch section, thereby forcing solid plastic material from the solids channel to the melt channel. Of course, as the solids channel narrows, the melt channel correspondingly widens during the increased pitch section, thereby accommodating solids entering the melt channel from the solids channel. The two flights continue throughout the metering section so that in the metering sections, remaining solids are advantageously placed on the push side of the main flight.

In a preferred form of the above described second form of the invention, a wave is disposed in the solids channel at a location coinciding with the section of increased pitch. Placement of a wave at this location further constricts the solids channel and encourages passage of solids over the secondary flight and the increased pitch section into the melt channel. Thus, the above described invention, in a second form, provides an alternative way of transferring solids from the trailing side of the main flight to the push side of the main flight, thereby increasing the pressure and shear force applied to the unmelted solids throughout the metering section.

One advantage of the present invention is that it allows higher pressure and shear to be applied to the solids, which in turn allows them to be mixed and eliminated more quickly than in conventional metering sections of extruder screws. Solids tend to mix least in the trailing side of the meter section channel of a conventional screw because the barrier flight is immediately downstream and bordering the solids channel. Because the barrier flight is undercut and thinner than the primary flight, the barrier flight does not provide the shear and pressure available from the main flight. By placing solids on the push side of the main flight, the present invention applies higher pressure and shear rates to the solids.

Another advantage of the present invention is that it affords higher output rates at lower melt temperatures than a conventional screw without the solids movement to the push side of the main flight. In turn, lower melt temperatures reduce degradation and volatilization problems associated with conventional multi-channel wave metering sections of extruder screws.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein:

FIG. 1 is a side elevational view in partial cross section of an extruding apparatus, with the barrel broken away to expose the screw according to the present invention;

FIG. 2 is an enlarged side elevational view of the screw of FIG. 1;

FIG. 3 is a side elevational view unwrapped in 360° increments placed adjacent to one another of a first embodiment of the present invention;

FIG. 4 is a fragmentary, longitudinal sectional view through the interchange portion of an extruder screw according to the present invention;

FIG. 5 is a side elevational view unwrapped in 360° increments placed adjacent to one another of a second embodiment of the present invention;

Figure 6:
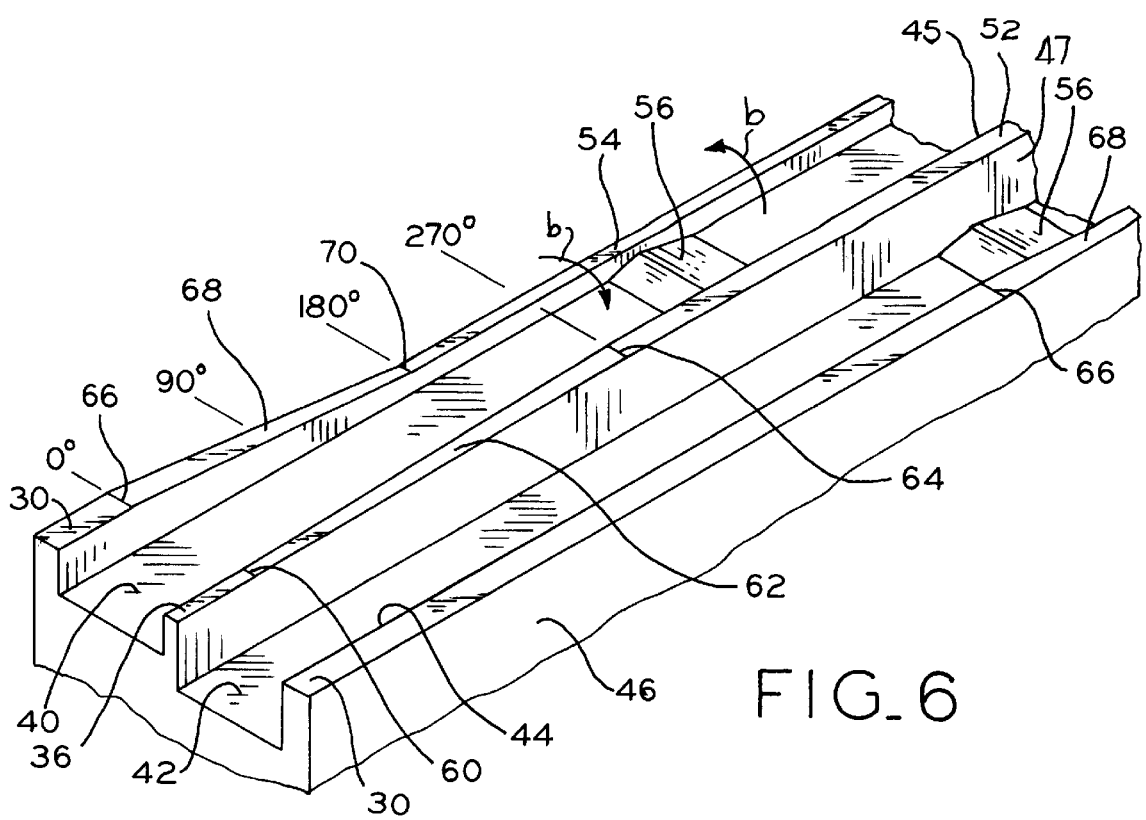
FIG. 6 is a fragmentary, perspective view illustrating the flight interchange of the first embodiment of the present invention.

Although the drawings represent embodiments of the present invention, the drawings are not necessarily to scale and certain features many be exaggerated in order to better illustrate and explain the present invention. The exemplification set out herein illustrates embodiments of the invention, in several forms, and such exemplifications are not to be construed as limiting the scope of the invention in any manner.

DETAILED DESCRIPTION OF THE INVENTION

The portions of a typical plasticating screw are well known to persons skilled in the art, and are disclosed in U.S. Pat. Nos. 3,870,284 and 4,173,417, both of which are assigned to the assignee of the present invention and are incorporated herein by reference. The invention can be incorporated in extruders and injection molding machines. It will be recognized that numerous variations are possible; however, such variations are not particularly significant as far as the present invention is concerned, and they need not be referred to in detail here.

With reference to FIG. 1, there is shown a typical plasticating apparatus 10 of the present invention in the form of an extruder. Screw 20 is disposed within cylindrical barrel 22. Apparatus 10 includes a feed hopper 24 into which plastic material in the form of pellets or dry powder is fed. Screw 20 includes body 26 having a drive hub 28, and a main flight 30 which traverses the length of feed section 32. Main flight 30 in feed section 32 has a constant diameter and a pitch equal to or nearly equal to the screw diameter, so forming a feed channel 34 of constant depth.

As shown in FIG. 2, disposed at the end of feed section 32 is secondary flight flight 36 which is generated ahead of main flight 30 by machining its helix angle at a greater angle than that of flight 30 for approximately one turn or until the flight leaves the pitch of the primary flight by about ⅓ of the width of the total feed channel. At this point, shown at 33 in FIG. 2, the helix angle of main flight 30 is changed to run parallel to the secondary flight 36 throughout the barrier melting section 38. It is desirable to maintain the width of the solids channel constant throughout the barrier section in order to avoid disturbing the solid bed.

As shown in FIG. 2, the barrier melting section 38 is divided into a solids channel 40 and a melt channel 42 with secondary flight 36 disposed therebetween. As can be seen in FIG. 2, secondary flight 36 is undercut, or has a smaller diameter than does main flight 30. Thus, as plasticated material is conveyed downstream along screw 20 through barrier melt section 38, a thin layer of melt material forms at the outer periphery of solids channel 40. This melt material is encouraged to flow over undercut secondary flight 36 and into melt channel 42 so that further solids can be melted between the outer periphery of solids channel 40 and the interior wall of barrel 22. Thus, traversing downstream along barrier melt section 38, the solids channel 40 decreases in depth whereas the melt channel 42 increases in depth to accommodate the increased amount of melt material and the corresponding decreased amount of solid material.

As shown in FIG. 2, main flight 30 includes a push side 44 and a trailing side 46. Traversing downstream along barrier melt section 38, it can be understood that the solids channel 40 is positioned on the trailing side of main flight 30 whereas the melt channel is positioned on the push side 44 of main flight 30. However, at the terminal end 48 of barrier melt section 38, the primary and secondary flights "interchange" so that the solids channel 40 in metering section 50 is located on push side 45 of the new primary flight 52 whereas the melt channel 42 is located on trailing side 47 of new primary flight 52.

The specific mechanism by which the flight interchange of the present invention is accomplished can be better understood with reference to FIGS. 3, 4 and 6. As shown in FIG. 3, at terminal end 48, secondary flight 36 increases in diameter and width to form new primary flight 52 whereas main flight 30, located one thread adjacent to secondary flight 36 downstream, decreases in diameter and width and transforms into new barrier flight 54. The new primary flight 52 and new barrier flight 54 maintain their relative orientation throughout the remainder of metering section 50. Thus, metering section 50, which includes waves 56 disposed in both solids channel 40 and melt channel 42, also includes the solids channel 40 being advantageously positioned on the push side 45 of new primary flight 52. Conversely, the melt channel 42 is disposed on the trailing side 47 of new primary flight 52, the benefits of which are further described hereinbelow.

With reference to FIGS. 4 and 6, the development of the interchange of the present invention can be better understood. As shown in FIG. 4, at the onset of terminal end 48 of transition section 38 (on the right side of FIG. 4) it can be seen that main flight 30 has a minimal clearance with the interior surface of cylindrical barrel 22 whereas secondary flight 36 is undercut, providing a greater clearance with the cylindrical barrel wall 22. Before the interchange of the present invention, main flight 30 has a width of 10% of the screw diameter whereas secondary flight 36 has a width of roughly 7.5% of the screw diameter. Similarly, the clearance between secondary flight 36 and the interior barrel wall is approximately 0.125 to 0.040 inches whereas the clearance between main flight 30 and the interior barrel wall is approximately 0.0015 times the screw diameter. Main flight 30 and primary flight 52 have a clearance of about 0.0015 times the screw diameter. Secondary flight 36 and new barrier flight 54 have a diameter which is 0.020 to 0.250 inches less than the diameter of main flight 30 and primary flight 52.

After the interchange of the present invention as shown on the left side of FIG. 4, the new primary flight 52, which was formerly secondary flight 36, now has minimal clearance with cylinder wall 22 whereas new barrier flight 54, which was formerly main flight 30, is now undercut and provides greater clearance from barrel 22. In an illustrated embodiment, new barrier flight 54 has substantially the same clearance as secondary flight 36 whereas new primary flight 52 has substantially the same clearance as main flight 30. As also shown in FIG. 4 and in more detail in FIG. 6, the new barrier flight 54 has a thread width substantially the same as secondary flight 36, whereas new primary flight 52 has a thread width substantially the same as main flight 30. The increased thread width of new primary flight 52 enables the pushing side of the thread to impart increased shear, whereas the decreased thread width of the new barrier flight 54 encourages melt material to flow thereover.

In the illustrated embodiment, the entire interchange of the present invention is complete within 360° about a longitudinal axis of screw 20. As shown in FIG. 6, secondary flight 36 begins to increase in diameter and width at point 60, includes a section of changing diameter and width 62 which extends over approximately 270° and terminates at point 64. Thereafter, the diameter and width of the newly formed primary flight 52 remains constant. At the same time, main flight 30 begins to decrease in diameter and width at point 66 and includes a section of decreasing diameter and width 68 which terminates at point 70. Thereafter, the newly formed barrier flight 54, having increased clearance and reduced width, continues at a new constant width and diameter as shown in FIG. 6. Section 68 extends a helical distance of approximately 180° as shown in FIG. 6 whereas the section of increasing diameter and width 62 extends a helical distance of approximately 270°. However, it is anticipated that the helical length of sections 62 and 68 could extend between 45° to 360°. In the embodiment shown in FIGS. 2, 4 and 6, secondary flight 36 must be centered with respect to main flight 30 to facilitate interchanging the flights. However, a wider solids channel can increase melting because more solids are in contact with the barrel wall. The embodiment shown in FIGS. 5 and 7 employs a wider solids channel because no interchange occurs. As shown in the exemplary embodiment in FIG. 6, the start of the respective changes in diameter and width of the main and secondary flights coincide with respect to the longitudinal axis of the screw. That is, they begin at the same angular position 60, 66 relative to the longitudinal axis of the screw, which corresponds to 0° as shown in FIG. 6. However, it is to be understood that the angular positions 60, 66 can be offset by ±90° and still be within the spirit and scope of the present invention.

Referring again to FIG. 3, it can now be appreciated that the positions of the solids channel and the melt channel with respect to the main flight and secondary flight have been completely reversed. That is to say, in metering section 50, solids channel 40 is positioned adjacent push side 45 of the new primary flight 52 whereas melt channel 42 is positioned adjacent trailing side 47 of new primary flight 52. Waves 56 disposed throughout metering section 50 as shown in FIG. 3 encourage melt material to cross over new barrier flight 54 in both directions. In other words, melt material can traverse across new barrier flight 54 from melt channel 42 into solids channel 40 and vice versa throughout metering section 50.

Figure 7:
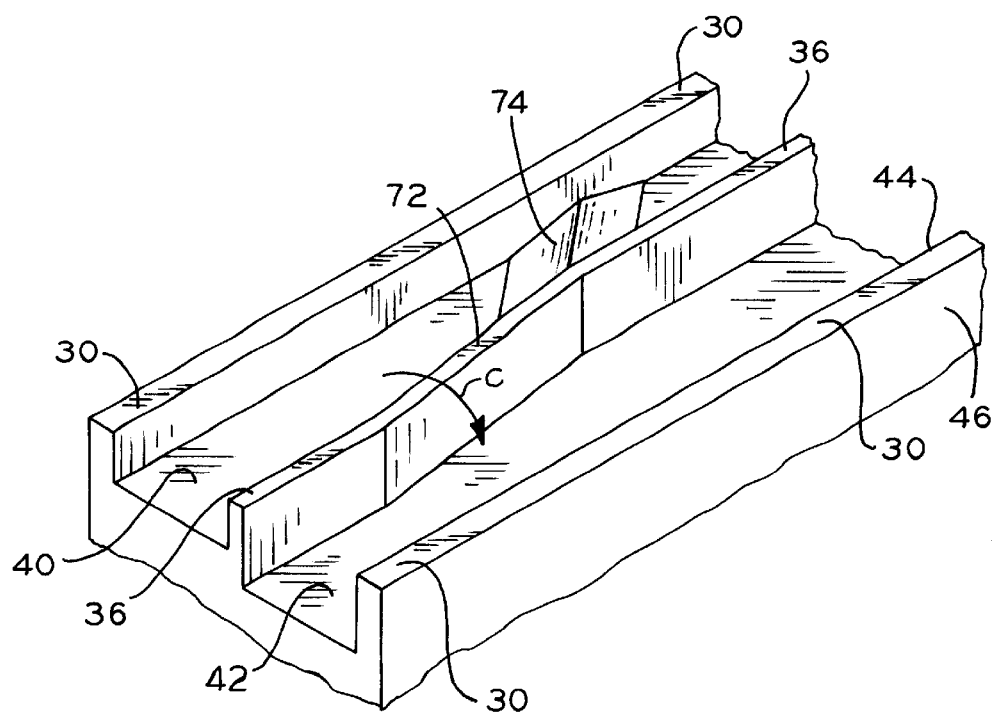
FIG. 7 is a fragmentary, perspective view illustrating the increased pitch section of the second embodiment of the present invention.

FIGS. 5 and 7 illustrate a second embodiment of the present invention which also includes a cross channel solids transition. As shown in FIG. 5, barrier melting section 38 includes secondary flight 36 and main flight 30 which are substantially the same as that shown in FIG. 3, except that melt channel 42 is more narrow and solids channel 40 is wider than the first above described embodiment. Solids channel 40 in the embodiment shown in FIGS. 5 and 7 is wider because a wide solids channel can increase melting. This is so because in a wide solids channel, more solids are in contact with the barrel. (By contrast, the embodiment shown in FIGS. 2, 4 and 6 includes roughly equal channel widths to facilitate the flight interchange successfullly). Solids channel 40 can range between 1.5 to 4 times as wide as melt channel 42. Otherwise, the barrier melt section illustrated in FIG. 5 is substantially the same as that shown and described above for FIG. 3. Significantly, however, the embodiment shown in FIGS. 5 and 7 accomplishes the cross channel solids transition by a different mechanism.

As shown in FIG. 5, terminal end 48 includes secondary flight 36 having a section of increased pitch 72 which extends approximately 90° about the longitudinal axis of screw 20. Thereafter, flight 36 resumes its original pitch. While the increased pitch section shown in this embodiment extends roughly 90° and then ends, the length of the increased pitch section could extend up to one and one half turn about the longitudinal axis of the screw. As shown in FIG. 5, the increased pitch section 72 of flight 36 causes the solids channel to narrow and the melt channel to widen rather abruptly. Coinciding with the termination of section 72, a wave 74 is formed in solids channel 40 in terminal end 48. As shown in FIGS. 5 and 7, solids channel 40 narrows immediately after which a wave is disposed in the solids channel. The net affect of the narrowing of the solids channel accompanied by wave 74 disposed in the channel is to encourage solid material to flow over secondary flight 36 and into melt channel 42. In this manner, solids are then placed on the push side of main flight 30 throughout metering section 50 as shown in FIG. 5. With reference to FIG. 7, it can be appreciated that the combined narrowing affect of channel 40 by section 72 of increased pitch coupled with wave 74, which further constricts flow in channel 40, forces solids to pass over secondary flight 36. In so doing, solids are transferred from solids channel 40 to melt channel 42 so that a larger percentage of solids are located on the push side 44 of main flight 30 throughout metering section 50. At the end of increased pitch section 72, the solids channel and melt channel have substantially the same width as shown in FIG. 5 because the double wave section is designed to work with equal width channels. Optionally, during section 72, the diameter of flight 36 can be reduced (not shown), or alternatively, flight 36 can be discontinuous (not shown) through section 72 in order to further encourage solid material to enter channel 42.

The operation of the screw in accordance with the present invention can be explained with reference to the figures. With reference to FIG. 1, plastic material in the form of pellets or dry powder is fed into hopper 24. Hopper 24 communicates with feed channel 34 of feed section 32 and conveys the plastic material therealong with screw rotation. The plastic material is heated and "worked" as it is conveyed along feed section 32 by main flight 30. That is to say, heat applied from barrel 22 and shear forces resulting from the conveyance along feed section 32 cause the solid plastic material to melt. Melting occurs primarily in the outer periphery of the channel in an area adjacent the interior wall of the screw barrel, whereby a thin layer of melt material forms. In barrier section 38, the thin melt film is encouraged to cross over the undercut secondary flight 36 and into the newly formed melt channel 42 as shown by arrows 'a' in FIG. 2. Solids continue to melt and are transferred from solid channel 40 to melt channel 42 along barrier melting section 38.

Toward the end of barrier melting section 38, solids in channel 40 are located adjacent the trailing side 46 of main flight 30 whereas melt in channel 42 is located adjacent the push side 44 of main flight 30. However, as noted, solids are more quickly eliminated by placing them on the push side of main flight 30 due to the increased pressure and shear force provided by main flight 30. Accordingly, the above described "interchange" of the present invention places the remaining solids on the push side of new primary flight 52 which continues throughout the metering section 50. Thus, the bulk of the unmelted solid material is placed on the high pressure, high shear push side 44 of new primary flight 52 and melting thereof is thereby enhanced. At the same time, however, melt material flows over new barrier flight 54 as shown by arrows 'b' in FIGS. 2, 3 and 6.

The second embodiment of the invention, illustrated in FIGS. 5 and 7, places solids on the push side of the primary flight by a different mechanism than does the first embodiment discussed above. At terminal end 48 of the barrier melt section 38 shown in FIG. 5, a large percentage of melt material is disposed in channel 42 whereas unmelted solids are located in solids channel 40. As solid material conveyed along solids channel 40 reaches terminal end 48, it encounters a rather abrupt decrease in available area caused by increased pitch section 72 coupled with wave 74 disposed in solids channel 40. These two factors combine to force solid material to cross over secondary flight 36 as shown by arrows 'c' in FIGS. 5 and 7. Thereafter, along metering section 50, a higher percentage of solids is located on the push side 44 of main flight 30, thereby encouraging the solids to be more efficiently melted.

While this invention has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A plasticating apparatus comprising:
a barrel having an inlet and an outlet;
a rotatable screw disposed within and cooperating with an inner wall of said barrel, said screw adapted for plasticating resinous material fed into said barrel through said inlet, said screw comprising:
a feed section, a barrier melting section and a metering section disposed sequentially downstream along said screw;
said screw including a main flight having a first push side and a first trailing side, said main flight forming a feed channel at said inlet of said screw;
a secondary flight disposed in said barrier melting section intermediate said main flight, said secondary flight and said main flight dividing said barrier melting section into a melt channel and a solids channel extending helically side by side, said secondary flight having helical threads with a diameter less than the diameter of helical threads of said main flight, so that melt material flows over said secondary flight and into said melt channel, whereby solid material conveyed along said barrier melting section is positioned adjacent said first trailing side whereas melt material conveyed along said barrier melting section is positioned adjacent said first push side; and
said main and said secondary flights interchanging at a terminal end of said barrier melting section, said interchanging comprising said main flight decreasing in diameter and becoming a new barrier flight and said secondary flight increasing in diameter and becoming a new primary flight, said new primary flight having a second push side and a second trailing side
said new primary flight and said new barrier flight continuing into said metering section, whereby solid material conveyed along said metering section is positioned primarily adjacent said second push side whereas melt material conveyed along said metering section is positioned primarily adjacent said second trailing side.

2. The apparatus of claim 1, wherein said secondary flight begins said increase in diameter at an angular position about the longitudinal axis of said screw substantially coinciding with said main flight beginning said decrease in diameter.

3. The apparatus of claim 1, wherein said interchange includes said main flight increasing in clearance within 360° about said longitudinal axis and said secondary flight decreasing in clearance within 360° about said longitudinal axis.

4. The apparatus of claim 3, wherein said interchange includes said main flight increasing in clearance over approximately 180° and said secondary flight decreasing in clearance over approximately 270°.

5. The apparatus of claim 1, wherein said interchange includes said main flight increasing in width and said secondary flight decreasing in width.

6. The apparatus of claim 1, wherein said new primary flight has a substantially constant diameter throughout said metering section and said new barrier flight has a substantially constant diameter throughout said metering section.

7. The apparatus of claim 1, wherein said main flight has a thread width greater than and said secondary flight in said barrier melting section.

8. The apparatus of claim 1, wherein said interchange includes said main flight decreasing in diameter by about 0.020 to 0.250 inches while said secondary flight increases in diameter by about 0.020 to 0.250 inches.

9. The apparatus of claim 1, wherein said new barrier flight has a diameter substantially the same as said secondary flight, whereas said new primary flight has a diameter substantially the same as said main flight.

10. The apparatus of claim 1, wherein said new barrier flight has a width substantially the same as said secondary flight, whereas said new primary flight has a width substantially the same as said main flight.

11. The apparatus of claim 1, wherein said metering section is a multi-channel wave metering section.

12. The apparatus of claim 1, wherein said secondary flight originates in said barrier melting section.

13. A plasticating apparatus comprising:

a barrel having an inlet and an outlet;

a rotatable screw disposed within and cooperating with an inner wall of said barrel, said screw adapted for plasticating resinous material fed into said barrel through said inlet, said screw comprising:

a feed section, a barrier melting section and a multi-channel wave metering section located sequentially downstream along said screw;

said screw including a main flight having a push side and a trailing side, said main flight forming a feed channel at said inlet of said screw;

a secondary flight disposed in said barrier melting section intermediate said main flight, said secondary flight and said main flight dividing said barrier melting section into a melt channel and a solids channel extending helically side by side, said solids channel being wider than said melt channel in said barrier section, said secondary flight having helical threads with a diameter less than the diameter of helical threads of said main flight, so that melt material flows over said secondary flight and into said melt channel, whereby solid material conveyed along said barrier melting section is positioned adjacent said trailing side of said main flight whereas melt material conveyed along said barrier melting section is positioned adjacent said push side of said main flight;

said secondary flight including an increased pitch section located at a terminal end of said barrier melting section, said secondary flight resuming substantially its original pitch after said increased pitch section ends, said solids channel decreasing in width during said increased pitch section, thereby abruptly forcing solid plastic material from said solids channel to said melt channel, said melt channel increasing in width during said increased pitch section, thereby accommodating solids entering said melt channel from said solids channel; and said secondary flight and said main flight continuing into said metering section, whereby solid material conveyed along said metering section is positioned primarily adjacent said push side whereas melt material conveyed along said metering section is positioned primarily adjacent said trailing side.

14. The apparatus of claim 13, wherein a wave crest is disposed in said solids channel at a location substantially coinciding with said increased pitch section, whereby said wave crest encourages passage of solids over said secondary flight in said section of increased pitch.

15. The apparatus of claim 13, wherein said solids channel and said melt channel maintain substantially constant widths throughout said barrier melting section, said solids channel and said melt channel narrow and widen respectively at a position along said screw coinciding with said increased pitch section, and said solids channel and said melt channel maintain substantially constant widths throughout said multi-channel metering section.

16. The apparatus of claim 13, wherein said increased pitch section extends more than 45° but less than 540° about a longitudinal axis of said screw.

17. The apparatus of claim 13, wherein said solids channel is between 1½ to 4 times wider than said melt channel in said barrier melting section.

18. The apparatus of claim 13, wherein said solids channel and said melt channel have a ratio of widths of about one to one in said metering section.

19. A plasticating apparatus comprising:

a barrel having an inlet and an outlet;

a rotatable screw disposed within and cooperating with an inner wall of said barrel, said screw adapted for plasticating resinous material fed into said barrel through said inlet, said screw comprising:

a feed section, a barrier melting section and a multi-channel wave metering section located sequentially downstream along said screw;

said screw including a main flight having a pushing side and a trailing side, said main flight forming a feed channel at said inlet of said screw;

a secondary flight disposed in said barrier melting section intermediate said main flight, said secondary flight and said main flight dividing said barrier melting section into a melt channel and a solids channel extending helically side by side, said solids channel being wider than said melt channel in said barrier section, said secondary flight having helical threads with a diameter less than the diameter of helical threads of said main flight, so that melt material flows over said secondary flight and into said melt channel, whereby solid material conveyed along said barrier melting section is positioned adjacent said trailing side of said main flight whereas melt material conveyed along said barrier melting section is positioned adjacent said push side of said main flight;

at a terminal end of said barrier section said solids channel narrows and said melt channel simultaneously widens; and a wave crest is disposed in said solids channel at a location substantially coinciding with said narrowing of said solids channel.

20. The apparatus of claim 19, wherein said secondary flight increases in clearance with said inner wall of said barrel simultaneously with said widening of said melt channel.

21. The apparatus of claim 19, wherein said secondary flight is discontinuous during said widening of said melt channel.

22. The apparatus of claim 19, wherein said widening and said narrowing are substantially complete within 540° about the longitudinal axis of said screw.

23. The apparatus of claim 19, wherein said solids channel is at least 1.5 times wider than said melt channel in said barrier section.

24. The apparatus of claim 23, wherein said solids channel is between 1.5 and 4 times wider than said melt channel in said barrier section.

25. The apparatus of claim 19, wherein said melt channel and said solids channel have substantially the same width in said metering section.

\* \* \* \* \*